(12) United States Patent
Yatsu et al.

(10) Patent No.: US 8,009,156 B2
(45) Date of Patent: Aug. 30, 2011

(54) HAPTIC SENSE RENDERING APPARATUS AND HAPTIC SENSE RENDERING METHOD

(75) Inventors: Nobuo Yatsu, Shinagawa (JP); Hideki Iwata, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 802 days.

(21) Appl. No.: 12/071,403

(22) Filed: Feb. 20, 2008

(65) Prior Publication Data

US 2009/0009481 A1 Jan. 8, 2009

(30) Foreign Application Priority Data

Jul. 5, 2007 (JP) ................................. 2007-177473

(51) Int. Cl.
*G06F 3/041* (2006.01)
(52) U.S. Cl. ...................... 345/204; 345/156; 345/173
(58) Field of Classification Search .......... 345/156–173, 345/204
See application file for complete search history.

(56) References Cited

U.S. PATENT DOCUMENTS

| 6,747,631 | B1 * | 6/2004 | Sakamaki et al. | 345/157 |
| 6,982,618 | B2 * | 1/2006 | Akieda et al. | 335/222 |
| 2005/0134562 | A1 * | 6/2005 | Grant et al. | 345/161 |
| 2006/0290662 | A1 * | 12/2006 | Houston et al. | 345/156 |

FOREIGN PATENT DOCUMENTS

| JP | 2000-330688 | 11/2000 |
| JP | 2004-145748 | 5/2004 |

* cited by examiner

*Primary Examiner* — Amare Mengistu
*Assistant Examiner* — Jennifer Zubajlo
(74) *Attorney, Agent, or Firm* — Staas & Halsey LLP

(57) ABSTRACT

A haptic sense rendering apparatus is disclosed that includes a haptic sense rendering unit, a magnet, a coil that magnetically interacts with the magnet and drives the haptic sense rendering unit, and a drive circuit that generates a drive signal for driving the haptic sense rendering unit to emphasize at least one of a drive starting operation and a drive terminating operation and supplies the generated drive signal to the coil.

8 Claims, 16 Drawing Sheets

FIG.7A

SUBJECT A

| BASIC PULSE THRUST INDICATING VALUE: 128, DURATION: 300ms |||||||
|---|---|---|---|---|---|---|
| | | AUXILIARY PULSE DURATION |||||
| | | 20ms | 40ms | 60ms | 80ms | 100ms |
| AUXILIARY PULSE THRUST INDICATING VALUE | 64 | ○ | ○ | ○ | ○ | ○ |
| | 48 | ○ | ○ | ○ | ○ | ○ |
| | 32 | ○ | ○ | ○ | ○ | ○ |
| | 24 | × | ○ | ○ | ○ | ○ |
| | 16 | × | × | × | × | × |

FIG.7B

SUBJECT B

| BASIC PULSE THRUST INDICATING VALUE: 128, DURATION: 300ms |||||||
|---|---|---|---|---|---|---|
| | | AUXILIARY PULSE DURATION |||||
| | | 20ms | 40ms | 60ms | 80ms | 100ms |
| AUXILIARY PULSE THRUST INDICATING VALUE | 64 | ○ | ○ | ○ | ○ | ○ |
| | 48 | ○ | ○ | ○ | ○ | ○ |
| | 32 | ○ | ○ | ○ | ○ | ○ |
| | 24 | × | × | ○ | ○ | ○ |
| | 16 | × | × | × | × | × |

FIG.8A

SUBJECT A

| BASIC PULSE THRUST INDICATING VALUE: 128, DURATION: 500ms |||||||
|---|---|---|---|---|---|---|
| | | AUXILIARY PULSE DURATION |||||
| | | 20ms | 40ms | 60ms | 80ms | 100ms |
| AUXILIARY PULSE THRUST INDICATING VALUE | 64 | ○ | ○ | ○ | ○ | ○ |
| | 48 | ○ | ○ | ○ | ○ | ○ |
| | 32 | ○ | ○ | ○ | ○ | ○ |
| | 24 | ○ | ○ | ○ | ○ | ○ |
| | 16 | × | × | × | × | × |

FIG.8B

SUBJECT B

| BASIC PULSE THRUST INDICATING VALUE: 128, DURATION: 500ms |||||||
|---|---|---|---|---|---|---|
| | | AUXILIARY PULSE DURATION |||||
| | | 20ms | 40ms | 60ms | 80ms | 100ms |
| AUXILIARY PULSE THRUST INDICATING VALUE | 64 | ○ | ○ | ○ | ○ | ○ |
| | 48 | ○ | ○ | ○ | ○ | ○ |
| | 32 | ○ | ○ | ○ | ○ | ○ |
| | 24 | × | × | × | ○ | ○ |
| | 16 | × | × | × | × | × |

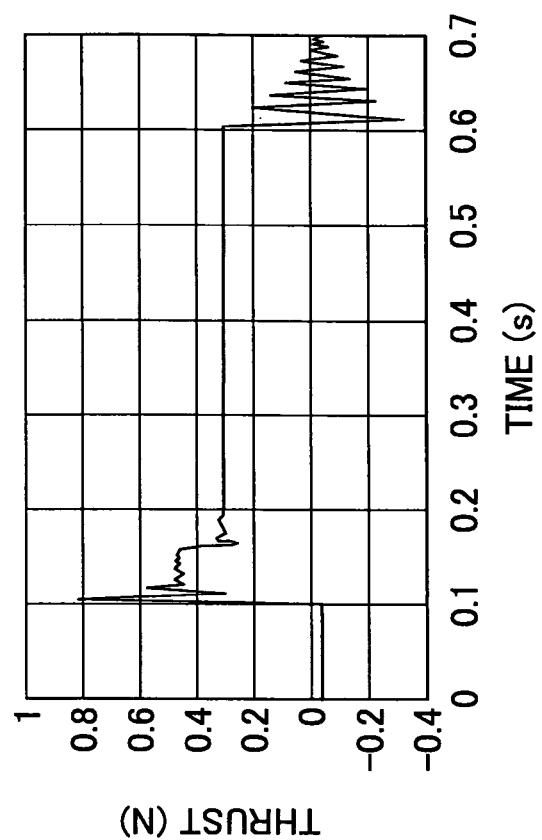
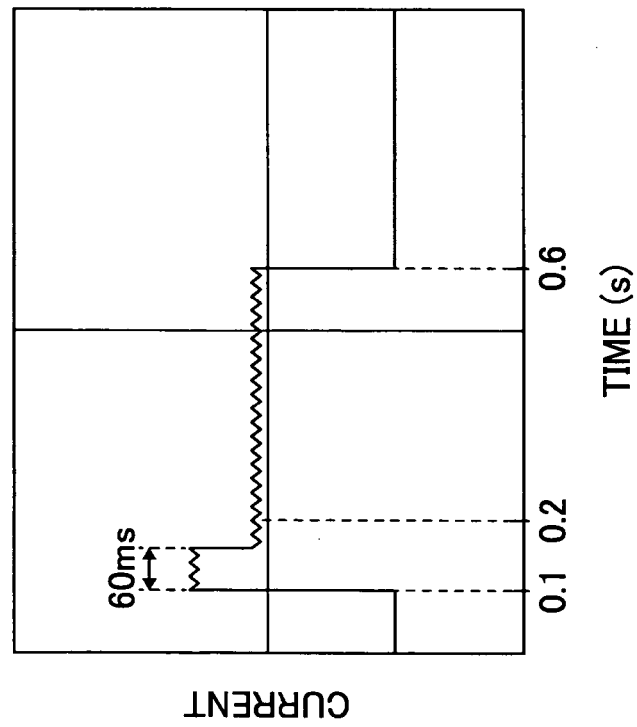

HAPTIC SENSE RENDERING APPARATUS AND HAPTIC SENSE RENDERING METHOD

BACKGROUND OF THE INVENTION

1. Field of the Invention

The present invention relates to a haptic sense rendering apparatus that renders haptic information through movement of a haptic sense rendering unit and a method of driving such a haptic sense rendering apparatus.

2. Description of the Related Art

In recent years and continuing, haptic sense rendering apparatuses are being developed for use in operations control devices such as an input unit of a computer, an operations unit of an audio apparatus, and an operations unit of a car navigation system that is installed in a vehicle. Such haptic sense rendering apparatuses are designed to convey information to an operator by rendering a haptic sensation via a haptic sense rendering unit so that the operator may feel a force at his/her fingertips upon touching the haptic sense rendering unit with his/her fingertips.

A flat mobile haptic sense rendering apparatus may have four magnets arranged flat on a plane and drive coils arranged above and parallel to these four magnets, and a thrust may be generated by supplying electric currents through these drive coils, for example. That is, by arranging plural drive coils to face plural magnets that are arranged flat on a plane and controlling the electric current being supplied to these drive coils, a desired force may be generated by the drive coils to thereby cause relative movement of a haptic sense rendering unit. It is noted that Japanese Patent Laid-Open Patent Publications No. 2000-330688 and No. 2004-145748 disclose examples of flat mobile haptic sense rendering apparatuses that implement such a configuration.

In the case of using such a haptic sense rendering apparatus in an input device of a computer or an operations unit of a vehicle, it is desired that the apparatus be miniaturized and the thrust generated by the drive coils be increased.

However, in order to increase the thrust to be rendered by the haptic sense rendering apparatus as is described above, the magnetic fields of the magnets have to be increased or the electric currents supplied to the drive coils have to be increased. To increase the magnetic fields of the magnets, suitable materials may have to be selected or the volume of the magnets has to be increased. It is noted that selecting suitable materials for the magnets may lead to cost increase. Also, in the case of increasing the volume of the magnets, miniaturization of the apparatus may be hampered.

Thus, in order to increase the thrust generated by the drive coils, the electric current supplied to the drive coils has to be increased. However, increasing the electric current supplied to the drive coils may lead to an increase in heat generation. This may be a problem since heat dissipation performance is degraded when the apparatus is miniaturized and heat generation per unit volume may be increased as a result.

Accordingly, there is a demand for a haptic sense rendering apparatus that is small in size and is capable of rendering a strong thrust without causing an increase in heat generation.

SUMMARY OF THE INVENTION

Aspects of the present invention are directed to providing a haptic sense rendering apparatus that is small in size and is capable of rendering a strong sense of thrust without causing an increase in heat generation and a method of driving such a haptic sense rendering apparatus.

According to one embodiment of the present invention, a haptic sense rendering apparatus is provided that includes a haptic sense rendering unit, a magnet, a coil that magnetically interacts with the magnet and drives the haptic sense rendering unit, and a drive circuit that generates a drive signal for driving the haptic sense rendering unit to emphasize a drive starting operation or a drive terminating operation and supplies the generated drive signal to the coil.

According to another embodiment of the present invention, a method of driving a haptic sense rendering apparatus that includes a haptic sense rendering unit, a magnet, and a coil that magnetically interacts with the magnet and drives the haptic sense rendering unit, the method comprising the steps of generating a drive signal for driving the haptic sense rendering unit to emphasize a drive starting operation or a drive terminating operation, and supplying the generated drive signal to the coil.

In one preferred embodiment, the drive signal may be arranged to have an amplitude that is greater than a basic amplitude of the drive signal upon driving the haptic sense rendering unit to perform the drive start operation or the drive terminating operation.

In another preferred embodiment, the drive signal may include a basic pulse and an auxiliary pulse that is attached to an edge portion of the basic pulse.

In another preferred embodiment, the auxiliary pulse may be attached to the rising edge portion of the basic pulse, have the same polarity as the basic pulse, and have an amplitude that is greater than the amplitude of the basic pulse.

In another preferred embodiment, the auxiliary pulse may be attached to the falling edge portion of the basic pulse and have an opposite polarity with respect to the polarity of the basic pulse.

In another preferred embodiment, the auxiliary pulse may be attached to the rising edge portion of the basic pulse and have an opposite polarity with respect to the polarity of the basic pulse.

In another preferred embodiment, the auxiliary pulse may include a first auxiliary pulse having an amplitude that is greater than the amplitude of the basic pulse and a second auxiliary pulse having an amplitude that is less than the amplitude of the basic pulse.

BRIEF DESCRIPTION OF THE DRAWINGS

FIGS. 7A and 7B are tables showing haptic test results of using differing drive pulses;

FIGS. 8A and 8B are tables showing haptic test results of using another set of differing drive pulses;

FIG. 12A is a diagram showing a current waveform of a drive signal including a basic pulse and an auxiliary pulse of 60 msec, and FIG. 12B is a diagram showing a thrust waveform obtained by the drive signal of FIG. 12A;

DESCRIPTION OF THE PREFERRED EMBODIMENTS

In the following, preferred embodiments of the present invention are described with reference to the accompanying drawings.

Figure 1:
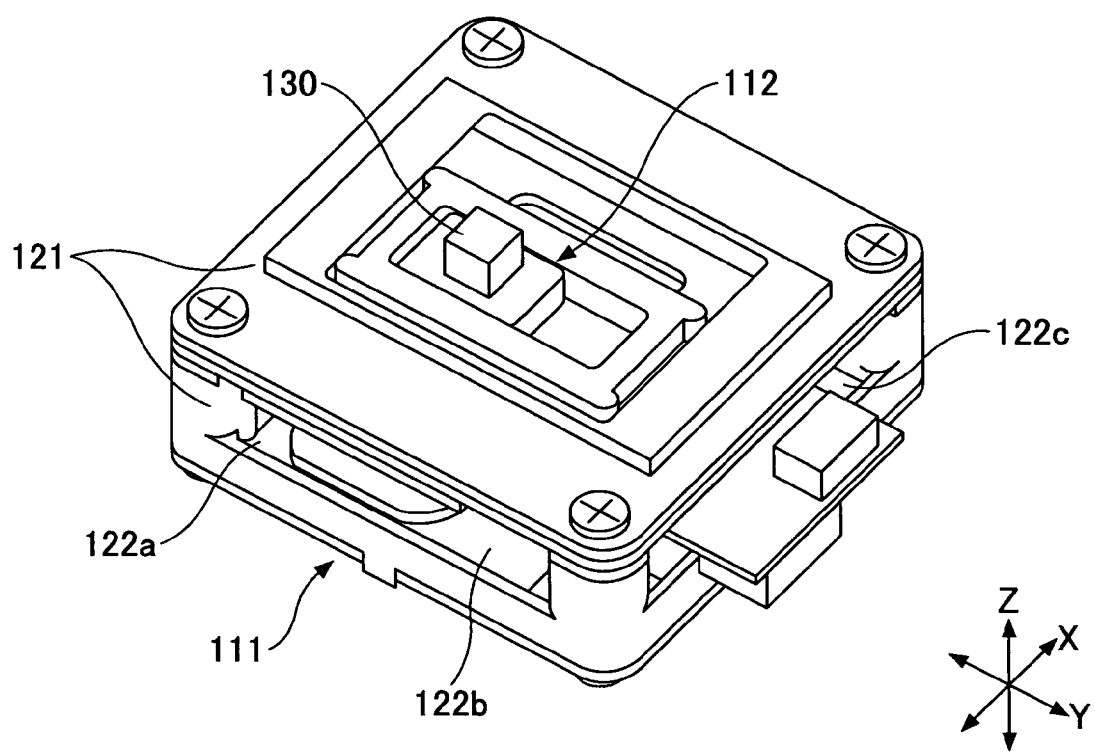
FIG. 1 is a perspective view of a haptic sense rendering apparatus according to an embodiment of the present invention.
Figure 2:
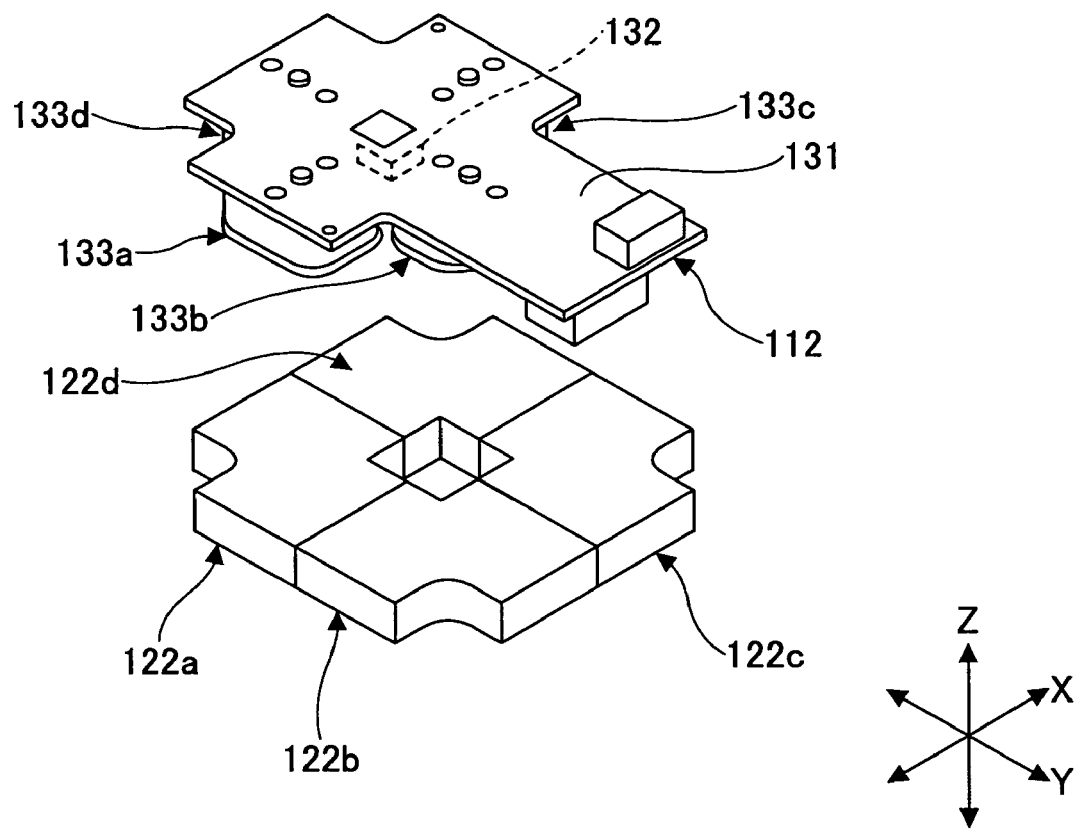
FIG. 2 is a exploded perspective view of a part of the haptic sense rendering apparatus shown in FIG. 1.
Figure 3:
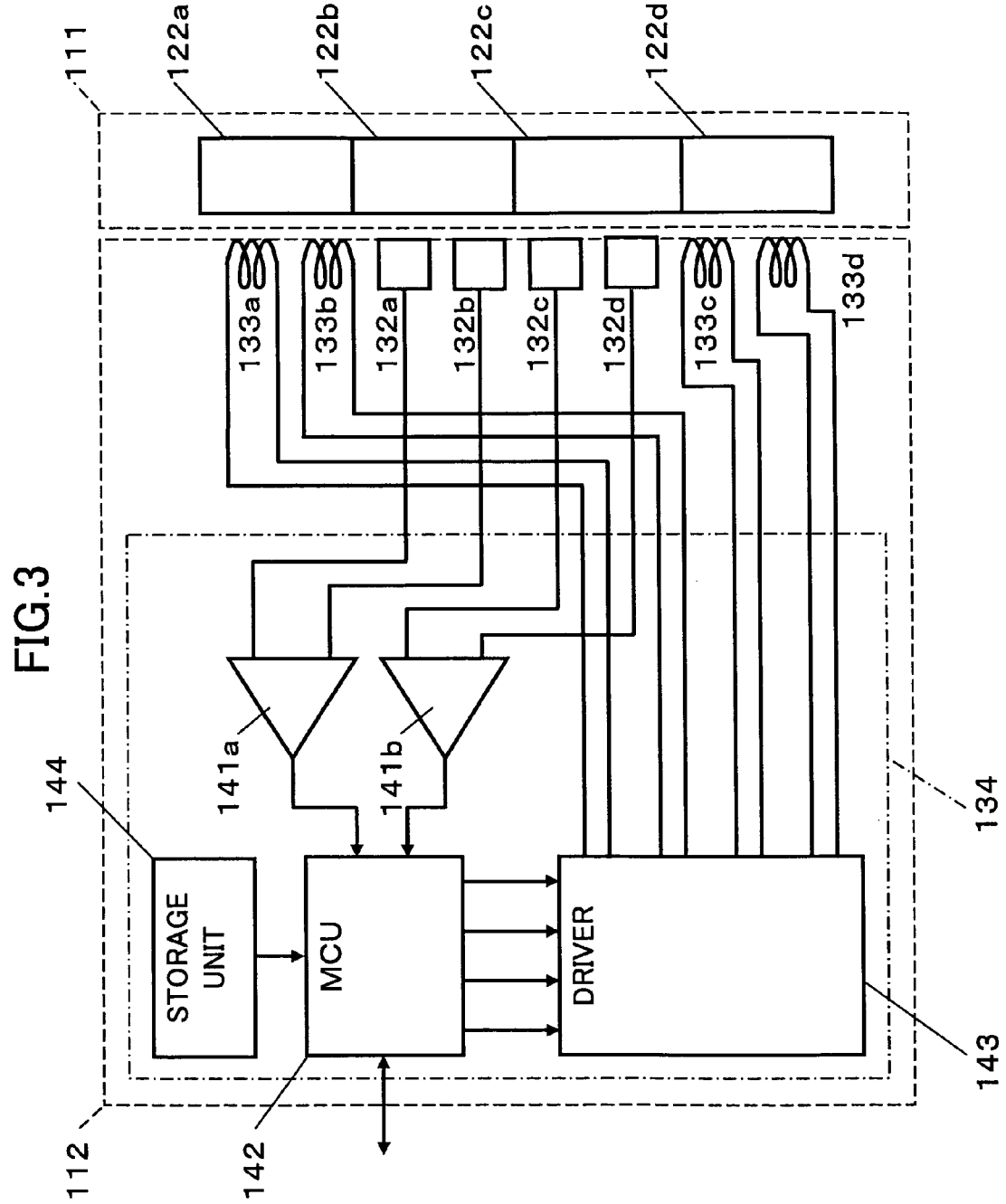
FIG. 3 is a circuit diagram of the haptic sense rendering apparatus shown in FIG. 1.
Figure 4:
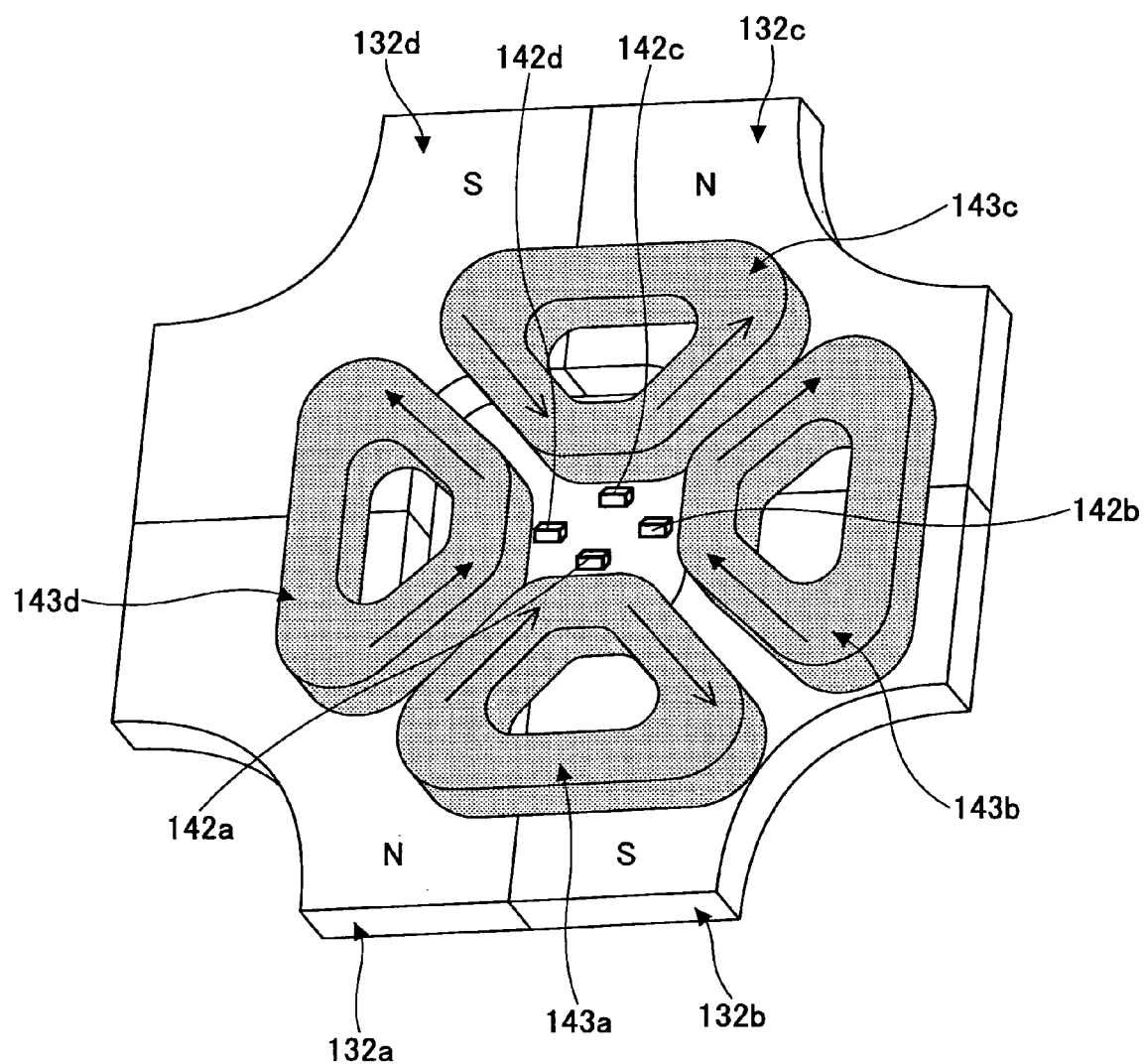
FIG. 4 is a diagram illustrating operations of the haptic sense rendering apparatus shown in FIG. 1.

FIG. 1 is a perspective view of a haptic sense rendering apparatus according to a first embodiment of the present invention; FIG. 2 is an exploded perspective view of a part of the haptic sense rendering apparatus according to the first embodiment; FIG. 3 is a circuit diagram of the haptic sense rendering apparatus according to the first embodiment; and FIG. 4 is a diagram illustrating operations of the haptic sense rendering apparatus according to the first embodiment.

The illustrated haptic sense rendering apparatus 100 according to the first embodiment corresponds to the so-called haptic actuator. The haptic sense rendering apparatus 100 is configured to drive a haptic sense rendering unit 112 on an X-Y plane corresponding to an operations plane based on a drive signal from a control unit 116.

The haptic sense rendering apparatus 100 includes a stationary part 111 that is made up of a frame 121 that fixes magnets 122a, 122b, 122c, and 122d in place on an X-Y plane in a ring-shaped arrangement. The magnets 122a, 122b, 122c, and 122d are plate-shaped magnets that have magnetic poles aligned in the Z directions perpendicular to the X-Y plane, and are arranged such that adjacent magnets have opposite magnetic polarities with respect to each other.

The haptic sense rendering unit 112 includes a circuit substrate 131 having a hole IC 132, coils 133a, 133b, 133c, 133d, and a controller 134 mounted thereon. The haptic sense rendering apparatus 112 is configured to move on the X-Y plane relative to the stationary part 11. Also, the haptic sense rendering unit 112 has a haptic unit 130 mounted thereon, and the haptic sense rendering unit 112 is configured to move according to the movement of this haptic unit 130.

The hole IC 132 includes four hole elements 132a, 132b, 132c, and 132d that are connected to the controller 134.

The controller 134 includes amplifiers 141a, 141b, an MCU (micro controller unit) 142, a driver 143, and a storage unit 144. The amplifier 141a outputs the difference between outputs of the hole element 132a and the hole element 132c. The hole elements 132a and 132c may be arranged along the X axis directions, for example. In this case, the amplifier 141a may output a signal according to the position of the haptic sense rendering unit 112 along the X axis directions relative to the position of the stationary part 111.

The amplifier 141b outputs the difference between outputs of the hole element 132b and the hole element 132d. The hole elements 132b and 132d may be arranged along the Y axis directions, for example. In this case, the amplifier 141b may output a signal according to the position of the haptic sense rendering unit 112 along the Y axis directions relative to the position of the stationary unit 111.

The outputs of the amplifiers 141a and 141b are input to the MCU 142. The MCU 142 creates position information of the haptic sense rendering unit 112 with respect to the stationary part 111 based on the outputs of the amplifiers 141a and 141b and inputs the position information to the control unit 116.

Also, the MCU 142 executes processes based on programs installed in the storage unit 144. For example, the MCU 142 may execute a process of generating a drive signal based on a drive command signal input thereto from the control unit 116 and inputting the generated drive signal to the driver 143. In this case, the MCU 142 may generate the drive signal based on auxiliary pulse waveform data stored in the storage unit 144.

It is noted that the drive signal may be an analog waveform signal or a digital waveform signal such as a PWM (pulse width modulated) signal.

The driver 143 may be a current amplifying circuit, a power amplifier, or an H bridge driver circuit, for example, and is configured to input a drive current to the coils 133a, 133b, 133c, and 133d based on the drive signal from the MCU 142. The coils 133a, 133b, 133c, and 133d are arranged to face the magnets 122a, 122b, 122c, and 122d. Specifically, the coil 133a is arranged between the magnets 122a and 122b, the coil 133b is arranged between the magnets 122b and 122c, the coil 133c is arranged between the magnets 122c and 122d, and the coil 133d is arranged between the magnets 122d and 122a. With such an arrangement, the magnets 122a, 122b, 122c, 122d, and the coils 133a, 133b, 133c, and 133d may make up a voice coil motor that is driven on the X-Y plane.

In this way, the haptic sense rendering unit 112 may move along the X-Y plane when drive currents are supplied to the coils 133a, 133b, 133c, and 133d.

Figure 5:
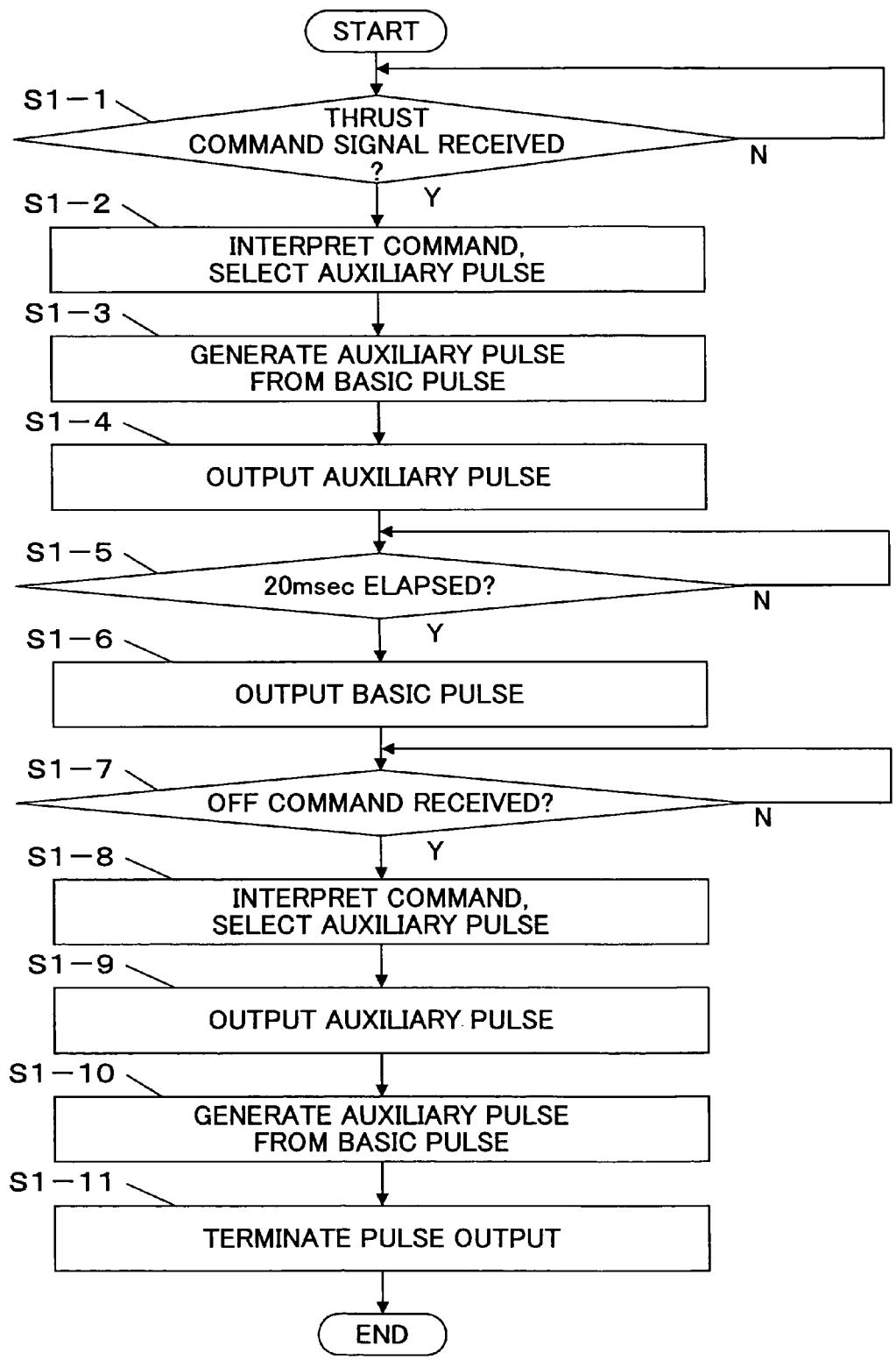
FIG. 5 is a flowchart illustrating process operations performed in response to receiving a thrust command signal.

FIG. 5 is a flowchart illustrating operations of the MCU 142 upon receiving a thrust command signal.

Upon receiving a thrust command signal from a superordinate apparatus (step S1-1), the MCU 142 interprets the received thrust command signal and selects an auxiliary pulse waveform according to the received thrust command signal (step S1-2).

Then, the MCU 142 creates an auxiliary pulse according to the thrust command signal using a basic pulse obtained by the thrust command signal (step S1-3). For example, the MCU 142 may create an auxiliary pulse having an amplitude that is approximately 1.5 times the amplitude of the basic pulse (step S1-3).

Then, the MCU 142 outputs the auxiliary pulse to the coils 133a, 133b, 133c, and 133d via the driver 143 (step S1-4). The MCU 142 then monitors the time to determine whether 20 msec has elapsed after outputting the auxiliary pulse (step S1-5). After 20 msec has elapsed after outputting the auxiliary pulse, the MCU 142 outputs the basic pulse in place of the auxiliary pulse (step S1-6).

Then, the MCU 142 monitors whether an off command signal is received from a superordinate apparatus (step S1-7). Upon receiving an off command signal from the superordinate apparatus (step S1-7, YES), the MCU 142 interprets the received off command signal and selects an auxiliary pulse waveform of an off pulse for terminating the process (step S1-8).

Then, the MCU 142 creates an auxiliary pulse according to the off command using the basic pulse (step S1-9), and outputs the auxiliary pulse (step S1-10). After completing the operations of outputting the auxiliary pulse (step S1-11), the present process may be terminated.

It is noted that the drive signal obtained in the above-described process may be distributed to the coils 133a, 133b, 133c, and 133d according to the direction of the thrust, for example. Alternatively, a drive signal made up of a basic pulse and an auxiliary pulse may be individually created for each of the coils 133a, 133b, 133c, and 133d according to the direction of the thrust.

In the following, the waveform of the drive signal obtained in the above-described process is described.

Figure 6:
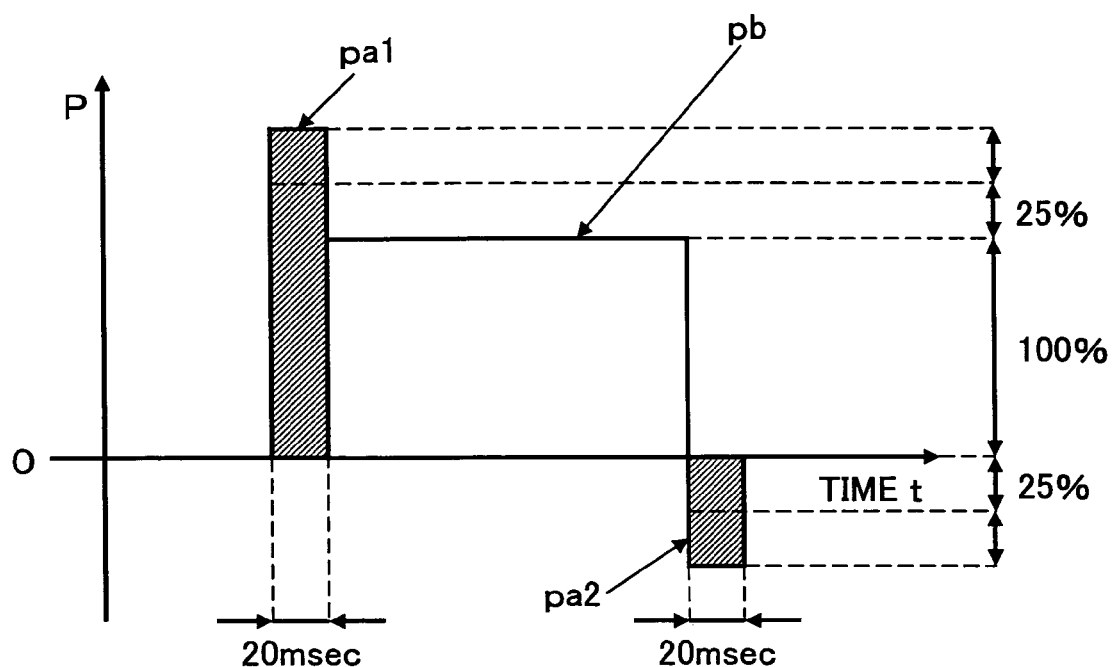
FIG. 6 is a diagram showing an exemplary waveform of a drive signal that may be used in an embodiment of the present invention.

FIG. 6 is a diagram illustrating an exemplary waveform of the drive signal obtained by the above-described process.

When the MCU 142 receives a thrust command signal, an auxiliary pulse pa1 is output from the driver 143 to at least one of the coils 133a, 133b, 133c, and 133d that is to be driven. In the illustrated example of FIG. 6, the auxiliary pulse pa1 is output for 20 msec after which a basic pulse pb is output. Then, when the MCU 142 receives an off command signal, another auxiliary pulse pa2 is output for 20 msec.

FIGS. 7A-15B are diagrams showing haptic test results of using various drive signals that include auxiliary pulses and basic pulses.

FIGS. 7A and 7B are tables indicating haptic comparison test results obtained by comparing a case of using a drive pulse including a basic pulse pb and an auxiliary pulse pa1 with a case of using a drive signal that only includes the basic pulse pb, where a thrust indicating value of the basic pulse pb is set to 128 (indicating a thrust of approximately 0.4 N), the output duration (pulse width) of the basic pulse pb is set to 300 msec, and the thrust indicating value and the output duration (pulse width) of the auxiliary pulse are arranged to vary. FIGS. 8A and 8B are tables indicating haptic comparison test results obtained by comparing a case of using a drive pulse including a basic pulse pb and an auxiliary pulse pa1 with a case of using a drive signal that only includes the basic pulse pb, where a thrust indicating value of the basic pulse pb is set to 128 (indicating a thrust of approximately 0.4 N), the output duration (pulse width) of the basic pulse pb is set to 500 msec, and the thrust indicating value and the output duration (pulse width) of the auxiliary pulse are arranged to vary. It is noted that FIGS. 7A and 8A show the haptic comparison test results obtained from subject A, and FIGS. 7B and 8B show the haptic comparison test results obtained from subject B. Also, in these tables, a circle ○ indicates that a difference was recognized between the case of using the drive pulse including both the auxiliary pulse pa1 and the basic pulse pb and the case of using the drive pulse only including the basic pulse pb, and a cross X indicates that such a difference was not recognized between the two cases.

As can be appreciated, FIGS. 7A, 7B, 8A, and 8B show comparison results obtained by varying the thrust indicating value of the auxiliary pulse pa1 to take five different values, 64, 48, 32, 24, and 16.

It is noted that the thrust indicating value of the auxiliary pulse pa1 represents a value to be added to the thrust indicating value 128 of the basic pulse pb. For example, when the thrust indicating value of the auxiliary pulse pa1 is set to 64, a thrust corresponding to the sum of this value 64 and the thrust indicating value 128 of the basic pulse pb (128+64)=192 is designated; that is, a thrust of approximately 0.6 N corresponding to the sum (128+64)=192 is designated by the thrust indicating value 64 of the auxiliary pulse pa1. Similarly, when the thrust indicating value of the auxiliary pulse pa1 is set to 16, a thrust of approximately 0.45 N corresponding to the sum of this value 16 and the thrust indicating value 128 of the basic pulse pb (128+16)=144 is designated.

Figure 9B:
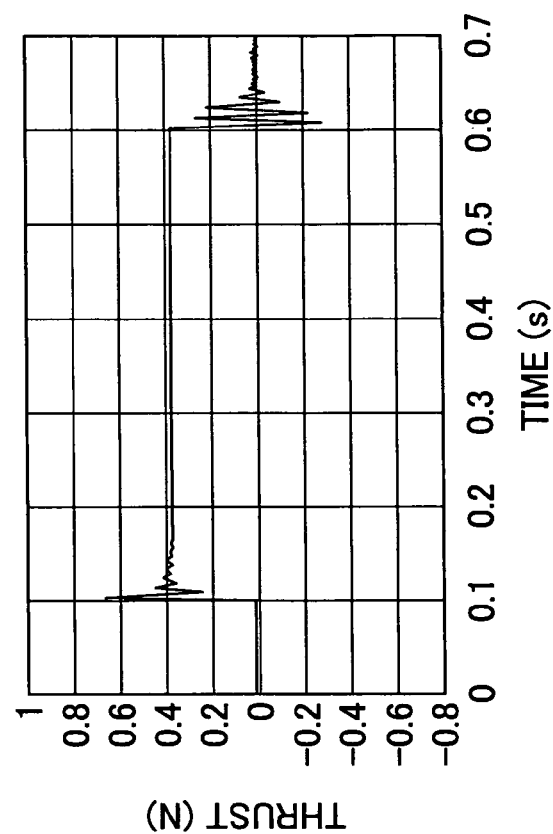
FIG. 9B is a diagram showing a thrust waveform obtained by the drive signal of FIG. 9A.
Figure 9A:
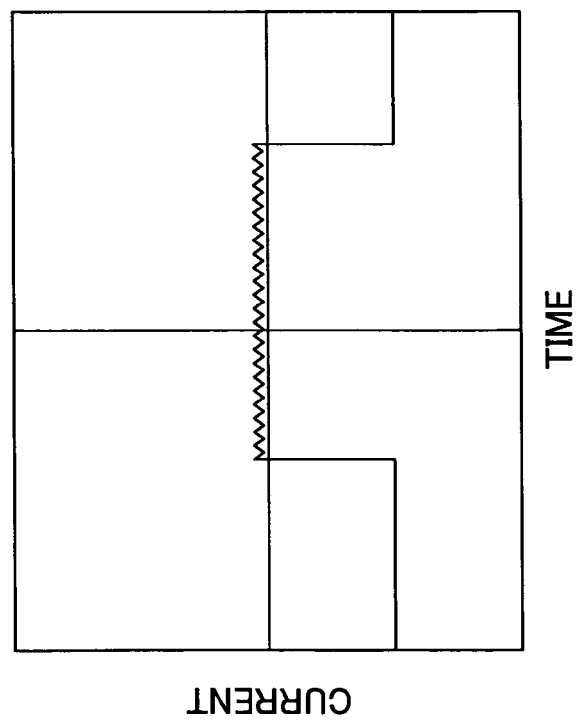
FIG. 9A is a diagram showing a current waveform of a drive signal including only a basic pulse.

FIG. 9A is a diagram showing a current waveform of a drive signal that only includes a basic pulse, and FIG. 9B is a diagram showing a thrust waveform obtained by the drive signal of FIG. 9A.

Figure 10B:
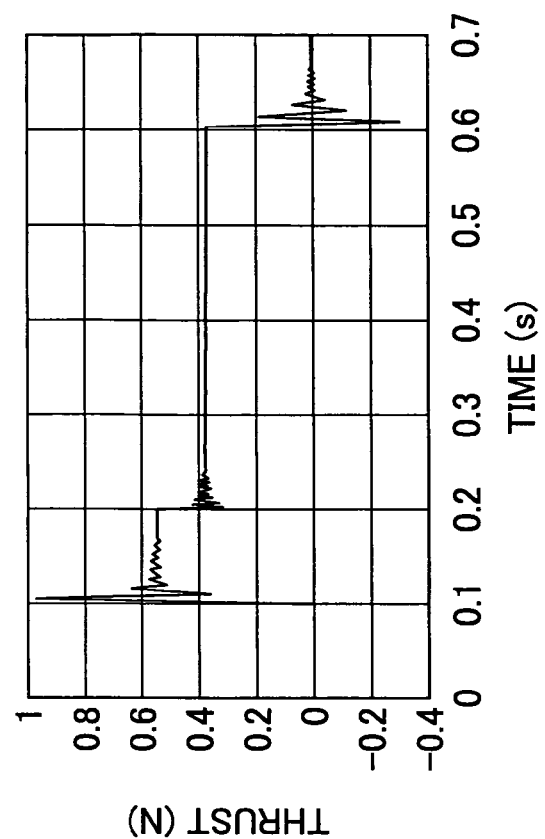
FIG. 10B is a diagram showing a thrust waveform obtained by the drive signal of FIG. 10A.
Figure 10A:
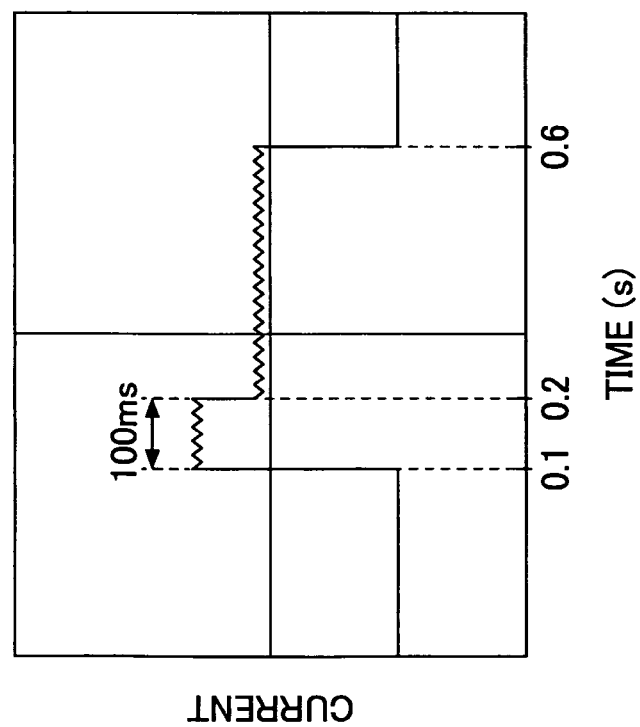
FIG. 10A is a diagram showing a current waveform of a drive signal including a basic pulse and an auxiliary pulse of 100 msec.
Figure 11B:
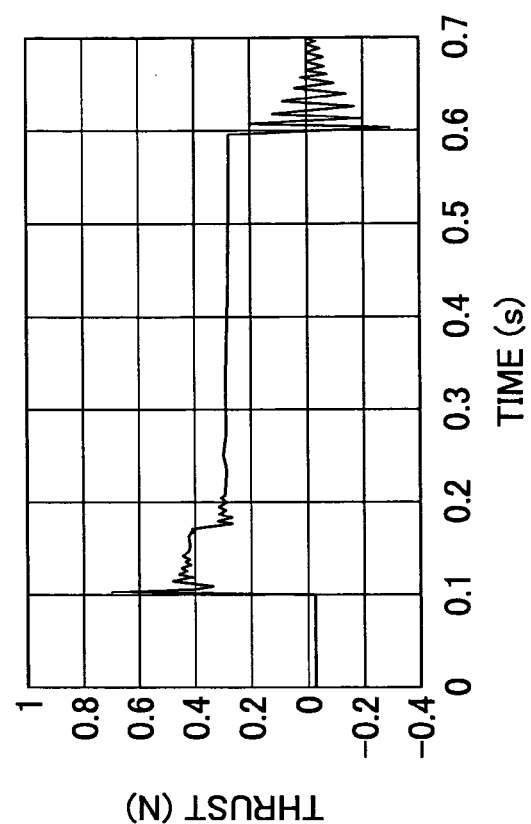
FIG. 11B is a diagram showing a thrust waveform obtained by the drive signal of FIG. 11A.
Figure 11A:
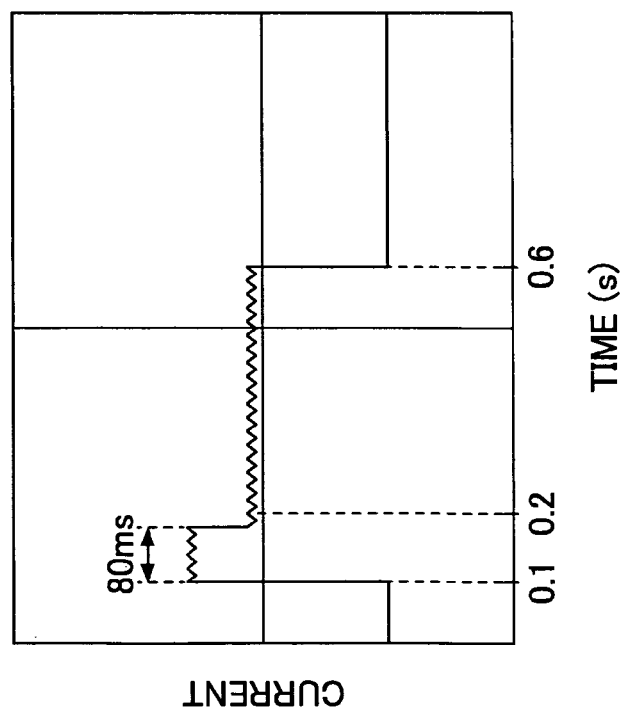
FIG. 11A is a diagram showing a current waveform of a drive signal including a basic pulse and an auxiliary pulse of 80 msec.
Figure 13B:
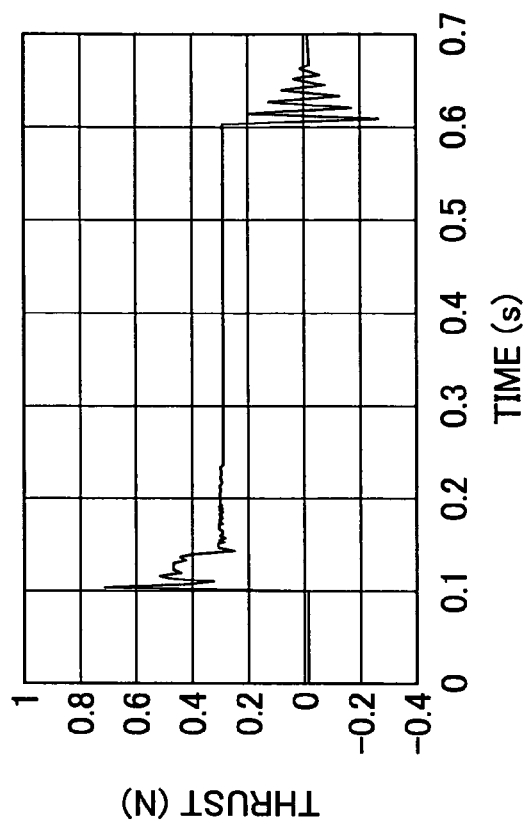
FIG. 13B is a diagram showing a thrust waveform obtained by the drive signal of FIG. 13A.
Figure 13A:
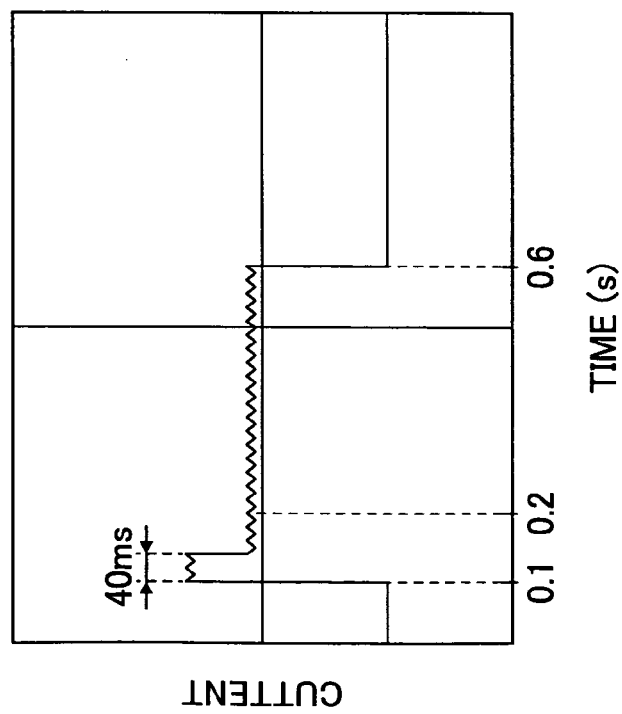
FIG. 13A is a diagram showing a current waveform of a drive signal including a basic pulse and an auxiliary pulse of 40 msec.
Figure 14A:
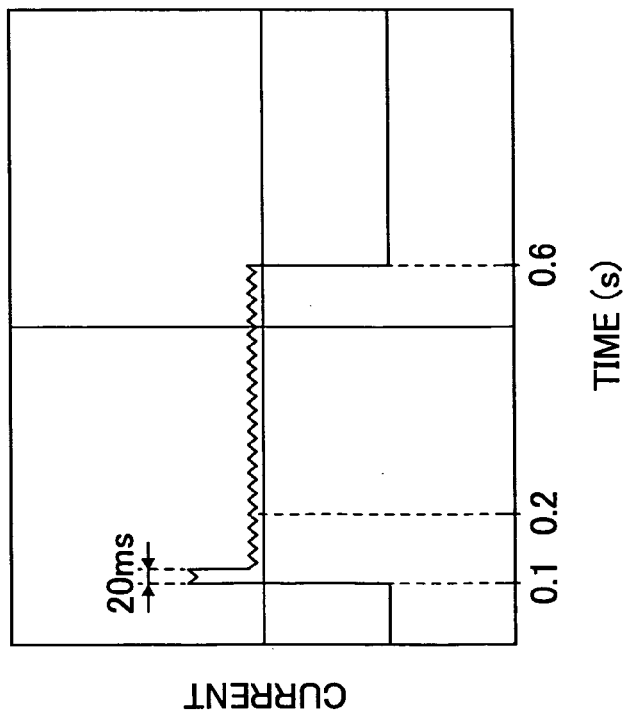
FIG. 14A is a diagram showing a current waveform of a drive signal including a basic pulse and an auxiliary pulse of 20 msec.
Figure 14B:
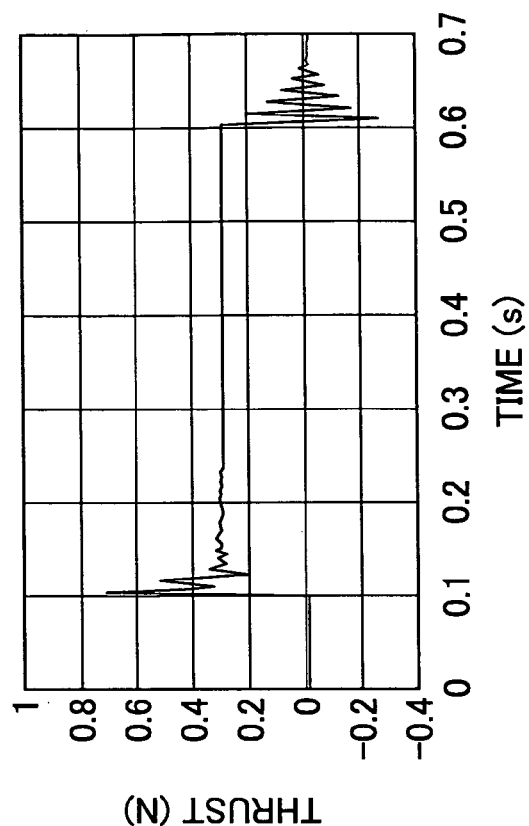
FIG. 14B is a diagram showing a thrust waveform obtained by the drive signal of FIG. 14A.
Figure 15B:
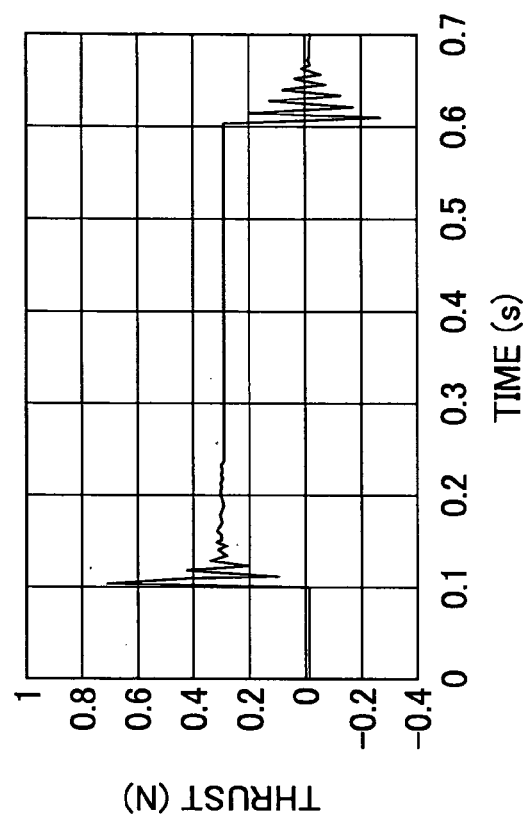
FIG. 15B is a diagram showing a thrust waveform obtained by the drive signal of FIG. 15A.
Figure 15A:
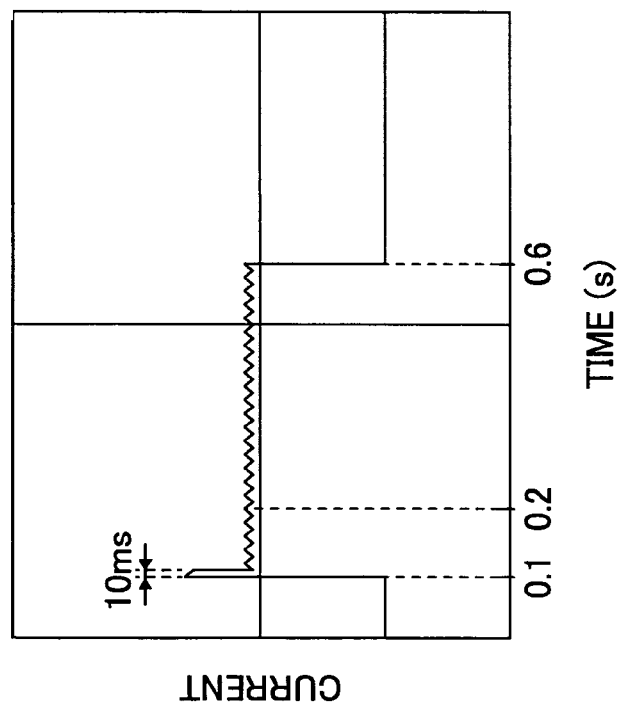
FIG. 15A is a diagram showing a current waveform of a drive signal including a basic pulse and an auxiliary pulse of 10 msec.

FIG. 10A is a diagram showing a current waveform of a drive signal that includes a basic pulse and an auxiliary pulse having a duration (pulse width) of 100 msec, and FIG. 10B is a diagram showing a thrust waveform obtained by the drive signal of FIG. 10A. FIG. 11A is a diagram showing a current waveform of a drive signal that includes a basic pulse and an auxiliary pulse having a duration of 80 msec, and FIG. 11B is a diagram showing a thrust waveform obtained by the drive signal of FIG. 11A. FIG. 12A is a diagram showing a current waveform of a drive signal that includes a basic pulse and an auxiliary pulse having a duration of 60 msec, and FIG. 12B is a diagram showing a thrust waveform obtained by the drive signal of FIG. 12A. FIG. 13A is a diagram showing a current waveform of a drive signal that includes a basic pulse and an auxiliary pulse having a duration of 40 msec, and FIG. 13B is a diagram showing a thrust waveform obtained by the drive signal of FIG. 13A. FIG. 14A is a diagram showing a current waveform of a drive signal that includes a basic pulse and an auxiliary pulse having a duration of 20 msec, and FIG. 14B is a diagram showing a thrust waveform obtained by the drive signal of FIG. 14A. FIG. 15A is a diagram showing a current waveform of a drive signal that includes a basic pulse and an auxiliary pulse having a duration of 10 msec, and FIG. 15B is a diagram showing a thrust waveform obtained by the drive signal of FIG. 15A.

As can be appreciated from FIGS. 7A-8B, a difference may be recognized between the case of using a drive pulse only including a basic pulse and the case of using a drive pulse including an auxiliary pulse and a basic pulse provided that the thrust indicating value of the auxiliary pulse pa1 is at least 32, namely, the thrust designated by the auxiliary pulse pa1 (thrust of approximately 0.5 N corresponding to the sum 128+32=160) is at least 125% of the thrust designated by the basic pulse pb (thrust of 0.4 N corresponding to the thrust indicating value 128), and the duration of the auxiliary pulse pa1 is at least 20 msec.

As can be appreciated from FIGS. 9B-15B, overshoot and oscillation occur at the rise time and fall time of the thrust waveforms. When the duration of the auxiliary pulse is too short (e.g., approximately 10 msec as in FIG. 15B), effects of the auxiliary pulse pa1 may be buried by the overshoot and oscillation. Specifically, the thrust to be rendered by a drive signal that only includes a basic pulse may not be adequately strengthened by using a drive pulse that includes an auxiliary pulse and a basic pulse in the case where the duration of the auxiliary pulse pa1 is too short.

Also, as can be appreciated from FIGS. 7A-8B, when the thrust indicating value of the auxiliary pulse pa1 is set to 16 so that a thrust of approximately 0.45 N corresponding to the value (128+16)=144, which is approximately 112.5% of the thrust of the basic pulse pb, is designated by the auxiliary pulse pa1, a difference cannot be recognized between the case of using a drive pulse that only includes the basic pulse pb and the case of using a drive pulse that includes the auxiliary pulse pa1 and the basic pulse pb even when the duration of the auxiliary pulse pb is arranged to be relatively long (e.g., approximately 100 msec). When the thrust indicating value of the auxiliary pulse pa1 is set to 24 so that a thrust of approximately 0.475 N corresponding to the value (128+24)=152, which is approximately 119% of the thrust of the basic pulse pb, is designated by the auxiliary pulse pa1, a difference between the case of using a drive pulse that only includes the basic pulse pb and the case of using a drive pulse that includes the auxiliary pulse pa1 and the basic pulse pb may or may not be recognized depending on other various factors.

As can be appreciated from the above descriptions, effects of the auxiliary pulse pa1 may be recognized when the auxiliary pulse pa1 is arranged to adequately enhance the thrust to be rendered by a drive signal, for example. In one preferred embodiment, the thrust indicated by the thrust indicating value of the auxiliary pulse pa1 may be set to at least 125% of the thrust indicated by the thrust indicating value of the basic pulse pb. In another preferred embodiment, the duration of the auxiliary pulse may be set to at least 20 msec.

Also, as is shown in FIG. 6, the drive signal may have another auxiliary pulse pa2 inserted at the fall of the basic pulse pb for enabling easy recognition of the end of the thrust applying process.

It is noted that in the above-described embodiment, the auxiliary pulse pa1 corresponds to an orthogonal wave. However, the present invention is not limited to such an embodiment and other types of waveforms may be used as the auxiliary pulse pa1 as well.

Figure 16:
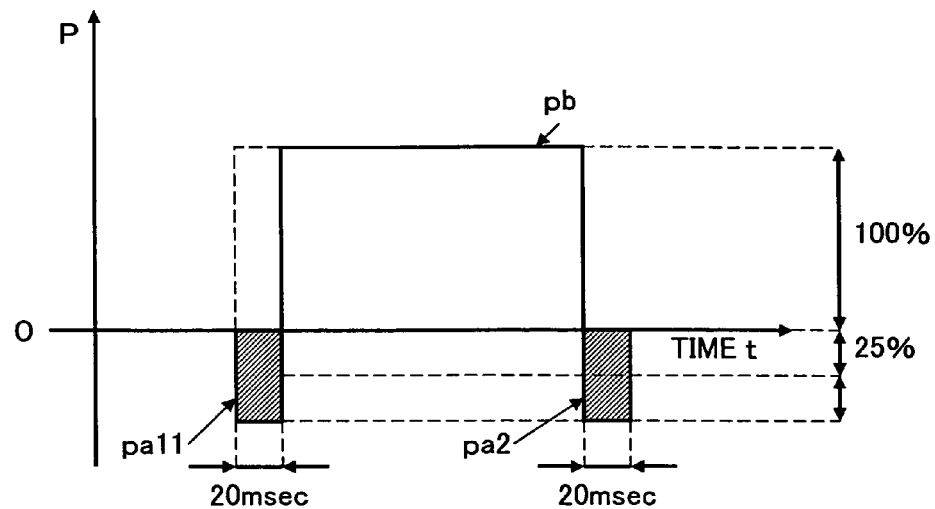
FIG. 16 is a diagram showing a waveform of a drive signal according to a first modified embodiment.

FIG. 16 is a diagram showing a waveform of a drive signal according to a first modified embodiment.

The drive signal according to the first modified embodiment includes an auxiliary pulse pa11 having a different waveform from that of the auxiliary pulse pa1 of the drive signal shown in FIG. 6.

The auxiliary pulse pa11 of the present modified embodiment has an opposite polarity with respect to that of the basic pulse pb, an amplitude that is at least 25% of the amplitude of the basic pulse pb, and a pulse width (duration) of 20 msec, for example.

By attaching the auxiliary pulse pa11 to the basic pulse pb as in the present modified embodiment, a thrust in an opposite direction with respect to the direction of the trust to be generated by the basic pulse may be applied before the thrust generated by the basic pulse pb is applied. In this way, the change in thrust from that rendered by the auxiliary pulse pa11 to that rendered by the basic pulse pb may be perceived as a thrust that is greater than the thrust corresponding to the amplitude of the basic pulse pb so that the thrust generated by the basic pulse pb may be perceived as being enhanced by using the drive signal of the present modified embodiment.

Figure 17:
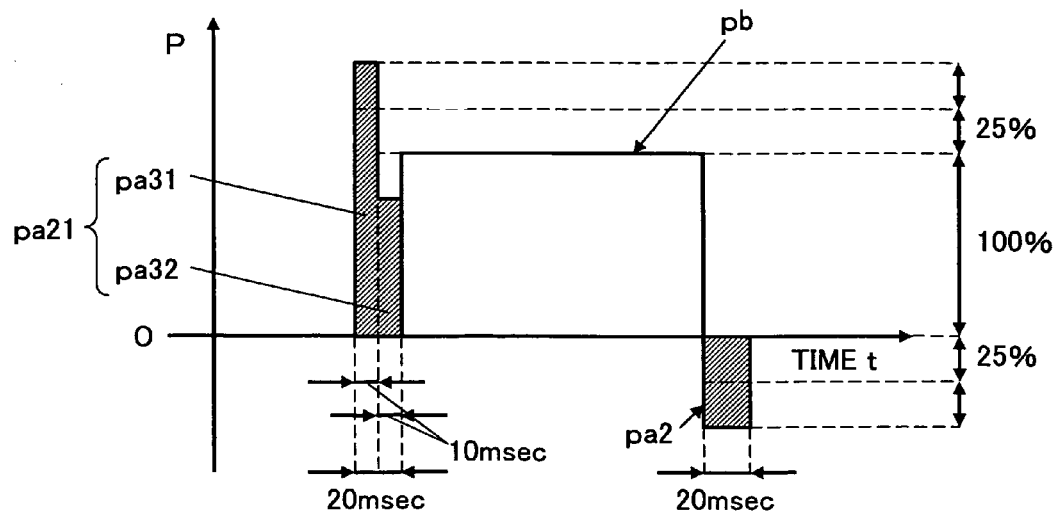
FIG. 17 is a diagram showing a waveform of a drive signal according to a second modified embodiment.

FIG. 17 is a diagram showing a waveform of a drive signal according to a second modified embodiment.

The drive signal according to the second modified embodiment includes an auxiliary pulse pa21 that is different from the auxiliary pulse pa1 of the drive signal shown in FIG. 6 and the auxiliary pulse pa11 of the drive signal shown in FIG. 16.

The auxiliary pulse pa21 of the present modified embodiment is made up of a first auxiliary pulse pa31 and a second auxiliary pulse pa32. The first auxiliary pulse pa31 has a same polarity as that of the basic pulse pb, an amplitude that is at least 125% of the amplitude of the basic pulse pb, and a pulse width (duration) of approximately 10 msec. The second auxiliary pulse pa32 is output after the first auxiliary pulse pa31 and has an amplitude that is approximately 75% of the amplitude of the basic pulse pb and a pulse width (duration) of approximately 10 msec.

By attaching the auxiliary pulse pa21 to the basic pulse pb as in the present modified embodiment, a thrust that is greater than the thrust to be generated by the basic pulse pb is generated by the first auxiliary pulse pa31 after which a thrust that is less than the thrust to be generated by the basic pulse pb is generated by the second auxiliary pulse pa32. Then, the thrust generated by the basic pulse may be applied. In this way, the thrust generated by the basic pulse pb may be perceived as being enhanced by using the drive signal according to the present modified embodiment.

As can be appreciated from the above-descriptions, according to certain aspects of the present invention, by generating a drive signal for driving a haptic sense rendering unit to emphasize a drive starting operation or a drive terminating operation, and supplying the generated drive signal to a coil that drives the haptic sense rendering unit, the drive starting operation or the drive terminating operation of the haptic sense rendering unit may be clearly indicated so that the thrust rendered by the haptic sense rendering unit may be perceived as being stronger than the actual thrust acting on the haptic sense rendering unit. In this way, a strong thrust may be felt by merely increasing the current supplied to the coil by a slight amount upon performing the drive staring operation or the drive terminating operation, for example. In turn, a haptic sense rendering apparatus that is small in size and is capable of rendering a strong sense of thrust without increasing heat generation may be realized.

It is noted that the haptic sense rendering apparatus 100 as described above is configured to generate an auxiliary pulse that is to be attached to a basic pulse upon receiving a command signal from a superordinate apparatus and input the generated auxiliary pulse to at least one of the coils 133a, 133b, 133c, and 133d. However, the present invention is not limited to such an embodiment and in another embodiment, a pulse waveform including a basic pulse and an auxiliary pulse may be generated at the superordinate apparatus and input to the haptic sense rendering apparatus 100 so that the haptic sense rendering apparatus 100 may be driven by the pulse waveform supplied by the superordinate apparatus.

Also, it is noted that although the auxiliary pulse is attached to the rising edge of the basic pulse of a current waveform in the above-described embodiments, the present invention is not limited to such embodiments and the auxiliary pulse may alternatively be attached to the rising edge of a thrust waveform to be output, for example.

Also, it is noted that although the haptic sense rendering apparatus 100 as described above corresponds to a two-dimensional haptic sense rendering apparatus, the present invention may similarly be embodied in a one-dimensional haptic sense rendering apparatus or a three-dimensional haptic sense rendering apparatus, for example.

Further, the present invention is not limited to these embodiments, and variations and modifications may be made without departing from the scope of the present invention.

The present application is based on and claims the benefit of the earlier filing date of Japanese Patent Application No. 2007-177473 filed on Jul. 5, 2007, the entire contents of which are hereby incorporated by reference.

What is claimed is:

1. A haptic sense rendering apparatus comprising:
a haptic sense rendering unit;
a magnet;

a coil that magnetically interacts with the magnet and drives the haptic sense rendering unit; and a drive circuit that generates a drive signal for driving the haptic sense rendering unit to emphasize at least one of a drive starting operation and a drive terminating operation and supplies the generated drive signal to the coil, wherein the drive signal generated by the drive circuit includes a basic pulse and an auxiliary pulse that is attached to an edge portion of the basic pulse and the auxiliary pulse is attached to a falling edge portion of the basic pulse and has an opposite polarity with respect to a polarity of the basic pulse.

2. The haptic sense rendering apparatus as claimed in claim 1, wherein the drive circuit arranges the drive signal to have an amplitude that is greater than a basic amplitude of the drive signal upon driving the haptic sense rendering unit to perform said at least one of the drive start operation and the drive terminating operation.

3. The haptic sense rendering apparatus as claimed in claim 1, wherein the auxiliary pulse has an amplitude that is greater than an amplitude of the basic pulse.

4. The haptic sense rendering apparatus as claimed in claim 1, wherein the auxiliary pulse includes a first auxiliary pulse having an amplitude that is greater than an amplitude of the basic pulse and a second auxiliary pulse having an amplitude that is less than the amplitude of the basic pulse.

5. A method of driving a haptic sense rendering apparatus that includes a haptic sense rendering unit, a magnet, and a coil that magnetically interacts with the magnet and drives the haptic sense rendering unit, the method comprising the steps of:

generating a drive signal for driving the haptic sense rendering unit to emphasize at least one of a drive starting operation and a drive terminating operation; and supplying the generated drive signal to the coil, wherein the drive signal includes a basic pulse and an auxiliary pulse that is attached to an edge portion of the basic pulse and the auxiliary pulse is attached to a falling edge portion of the basic pulse and has an opposite polarity with respect to a polarity of the basic pulse.

6. The method as claimed in claim 5, further comprising a step of:

arranging the drive signal to have an amplitude that is greater than a basic amplitude of the drive signal upon driving the haptic sense rendering unit to perform said at least one of the drive starting operation and the drive terminating operation.

7. The method as claimed in claim 5, wherein the auxiliary pulse has an amplitude that is greater than an amplitude of the basic pulse.

8. The method as claimed in claim 5, wherein the auxiliary pulse includes a first auxiliary pulse having an amplitude that is greater than an amplitude of the basic pulse and a second auxiliary pulse having an amplitude that is less than the amplitude of the basic pulse.

* * * * *